Patented Sept. 18, 1945

2,384,846

UNITED STATES PATENT OFFICE 2,384,846

RESINOUS MATERIAL AND PROCESS OF MAKING

Charles G. Moore, River Forest, Ill., assignor to The Glidden Company, Cleveland, Ohio, a corporation of Ohio No Drawing. Application November 8, 1941, Serial No. 418,383

3 Claims. (Cl. 260—22)

This invention relates to a process and a resulting product which may be described as either a synthetic oil or a synthetic resin. The product is of the nature of synthetic resins but it is primarily used as an oil, and is a viscous liquid in physical appearance. This product, described below, may be used in conjunction with other oils, and/or resins to produce varnishes, inks, and for coating and impregnating purposes, either clear or pigmented.

It has long been recognized that when maleic anhydride is reacted with a monoglyceride or a drying or semi-drying oil, the acid number of the resulting product cannot be reduced below 80–100. Furthermore, the product of such a reaction is very heavy in body and is seldom miscible with other drying and/or semi-drying oils. Such a product is also insoluble in petroleum solvents. If it is attempted to reduce the acid number below this point, the material gels, becomes insoluble in solvents such as ketones, esters and ethers as well as petroleum solvents, and finally chars. The explanation for this action is that polymerization takes place more rapidly than esterification with the result that an insoluble gel is produced before the acid number is sufficiently lowered. These statements hold for amounts of material of 2000 grams and upwards. If smaller amounts of reacting substances, such as 200 grams are reacted together, the acid number may be reduced below 80 and yield a product which is soluble in ketones, esters and petroleum solvents, as well as miscible in all proportions with other drying and semi-drying oils.

Rosenblum, in United States Patent No. 2,063,855 has disclosed a method of overcoming this difficulty by preparing a different product. In his patent, he prepares a di-glyceride of low acid value and combines this product with maleic acid or anhydride to produce a product of low acid value. He recognizes in his patent that the monoglyceride when reacted with sufficient maleic anhydride to combine with the remaining free hydroxyls, gives a product of high acid value (80–100), as described in the previous paragraph. Rosenblum's product may be described as a polymer of the following product, together with free or semi-combined acid:

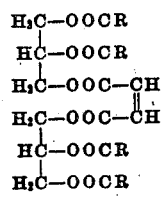

where R represents the radical of a fatty acid obtained by the hydrolysis of a drying or semi-drying oil.

The product described in this invention may be represented as consisting primarily of polymers of the following compound, together with a limited amount of free or semi-combined acid:

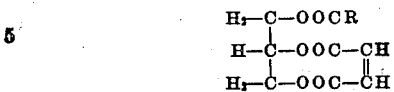

in which "R" represents the radical of a fatty acid obtained upon the hydrolysis of a drying or semi-drying oil.

The present invention contemplates the method of reacting a monoglyceride of a drying or semi-drying oil fatty acid together with sufficient maleic anhydride to combine with the free hydroxyl groups in the monoglyceride. The product obtained by reacting these ingredients together at a low temperature, 250°–300° F., has an acid number below 80–100, usually 30–60, and is soluble in solvents such as esters, ketones, petroleum and coal tar hydrocarbons. It is also miscible in all proportions with other drying and semi-drying oils. It may also be cooked together with various resins and oils, and when so cooked, the acid value may be still further reduced. The product obtained by this cooking process may be made into a varnish by dissolving in suitable solvents and adding driers to the product.

In a preferred form of this invention one mol. of glycerine is heated together with one mol of soya oil fatty acids until the acid value is reduced to about 2. This monoglyceride is then reacted at 250°–300° F. with one mol of maleic anhydride until the acid value is reduced to about 30–60, or below 80. The resulting product is miscible with oils such as linseed oil, fish oil, soya bean oil, sunflower oil, China-wood oil, etc. It is important that the monoglyceride and maleic anhydride be heated at a low temperature so that the rate of esterification of the monoglyceride and maleic anhydride will proceed at a more rapid rate than the polymerization of the reaction product. If the monoglyceride and maleic anhydride are heated together at a higher temperature, 450° F., for example, the polymerization proceeds at a much more rapid rate than the esterification and results in the material forming an insoluble gel on cooling down before the acid value can be reduced below 80–100, the only exception being, if very small amounts (200–300 gms.) of the material are reacted together and cooled down quickly.

Example 1

| | Grams |
|---|---|
| Soya oil fatty acids | 1264 |
| 95% glycerine | 440 |
| Maleic anhydride | 432 |

The fatty acids and glycerine are heated together at 450° F., until a low acid value is obtained, the monoglyceride so formed is then cooled to 300° F., and the maleic anhydride is added. The whole is then heated at 250°–300° F., until the acid value is reduced to 30–50.

*Example 2*

|  | Grams |
|---|---|
| Linseed fatty acid monoglyceride | 1610 |
| Maleic anhydride | 432 |

The monoglyceride is heated together with the maleic anhydride at 250°–300° F., until the acid value is reduced to 30–50.

It is not to be understood that only soya oil fatty acids or monoglycerides may be used but other semi-drying or drying oil acids or monoglycerides such as linseed, fish, sunflower, cottonseed, rubberseed, safflower, hempseed and similar oil acids and the monoglycerides thereof may be substituted for soya, or mixtures of various drying and semi-drying oils may be employed.

Having described the invention what is claimed is:

1. The process which consists in reacting glycerine and fatty acids selected from the class consisting of drying and semi-drying oil fatty acids in substantially equimolecular proportions until a substantially neutral product is formed, and heating the resulting reaction product with substantially an equimolecular quantity of maleic anhydride at a temperature of 250°–300° F. for a time sufficient to reduce the acid number to about 60–30.

2. A resinous product resulting from the process of claim 1.

3. A resinous product resulting from the process of claim 1 dissolved in a glyceride oil selected from the class consisting of drying and semi-drying glyceride oils.

CHARLES G. MOORE.